Dec. 5, 1950  G. A. SHAIEB  2,532,676
TRAILER HITCH
Filed May 9, 1947

INVENTOR.
George A. Shaieb
BY
*Hawke & Hardesty*
ATTORNEYS

Patented Dec. 5, 1950

2,532,676

UNITED STATES PATENT OFFICE 2,532,676

TRAILER HITCH

George A. Shaieb, Detroit, Mich., assignor to Active Tool & Manufacturing Company, Detroit, Mich., a corporation of Michigan Application May 9, 1947, Serial No. 747,098

2 Claims. (Cl. 280—33.17)

The present invention relates to a means for coupling or hitching, a trailer to an automobile or other tractor and has among its objects a hitch that overcomes certain difficulties heretofore encountered.

In trailer hitches heretofore used one of the difficulties encountered has been the crystalizing and breaking of the ball forming a member of the customary ball-and-socket joint.

An object of the present invention is to provide a construction in which this objection is overcome.

Another object of the invention is to provide a simpler and more easily operated coupling means and one that may be quickly and easily locked against uncoupling, accidental or otherwise.

Figure 1:
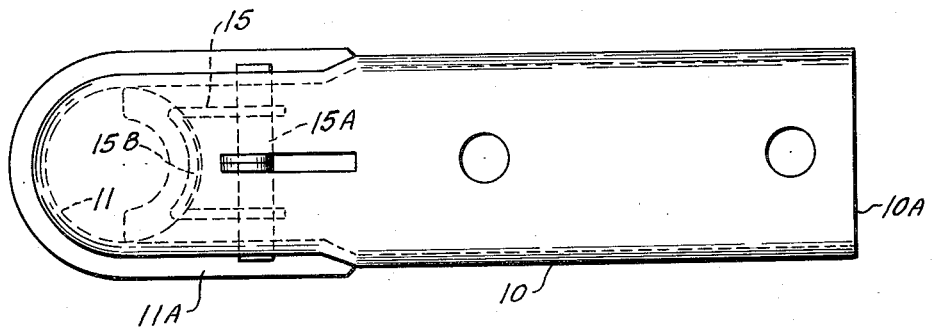

Still other objects and advantages will be apparent to those skilled in the art upon reference to the following description and the accompanying drawings in which Fig. 1 is a top plan view of the hitch.

Figure 2:
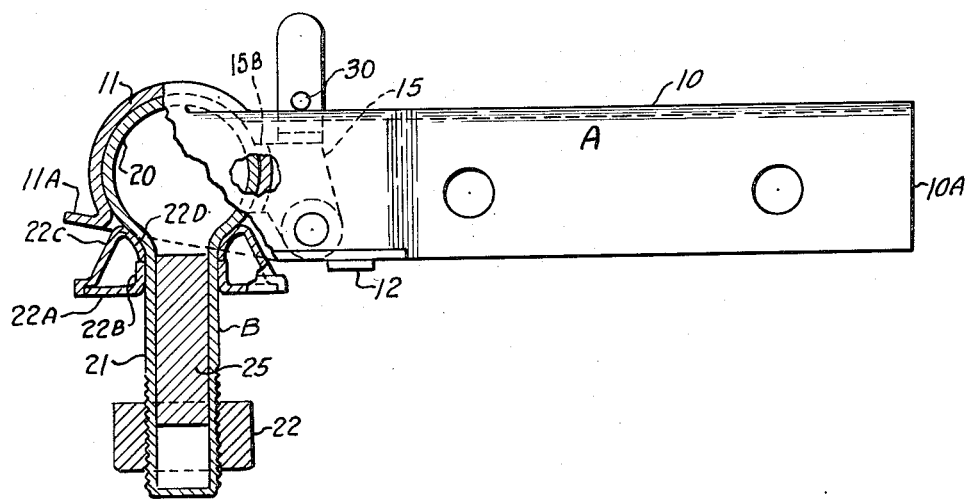

Fig. 2 is a side elevation of the same with parts in section.

As indicated in the drawings, the hitch consists of two main elements A and B, one of which, preferably A, is permanently attached to the trailer (not shown) and the other permanently attached to the tractor, such as an automobile (not shown).

The element A consists of a channel member 10 opening downwardly for the greater portion of its length and open at one end 10A.

At the other end, the channel member 10 is closed and formed to provide a socket 11 which has a spherical inner surface extending substantially 180° in a horizontal plane and substantially 180° in a vertical longitudinal plane, the latter however being so located that the lower edge of the spherical surface is well below the horizontal center plane.

The socket 11 is preferably formed with a substantial stiffening flange 11A extending around the socket edge. The socket 11 is open at the bottom and that side toward channel 10 and a cross member 12 is preferably welded or otherwise fixed to the channel walls against the socket so that there is eliminated any tendency for the socket to spread.

Also carried by channel 10 is a latch or locking member 15 pivoted on a pin 15A extending across the channel 10 and provided with a portion 15B having a spherical face of the same radius as that of the socket 11 and so located, when in locked position that the spherical surfaces of the socket and latch form portions of the same theoretical sphere, with the center of surface 15B slightly below the horizontal plane passing through the center of the sphere.

This element A of the hitch is designed to cooperate with the ball portion of element B, which consists of a ball 20 whose outer radius is such that the ball provides a sliding fit in the spherical socket above described.

The ball 20 is formed on a stem 21 threaded at its lower end to coact with a suitable nut 22 by means of which it may be fixed to the tractor automobile, and surrounded by a collar 22 serving as an abutment opposed to the action of the nut.

In producing the ball and collar assembly, the ball 20 and stem 21 are first formed in halves from suitable sheet metal stock, each consisting of a half ball and half stem. The collar 22 is produced by stamping and forming a washer 22A having a substantial flange 22B around the central opening. A second washer 22C is also stamped and formed to provide a conical cross-section with an inwardly directed flange 22D around its central opening.

This flange 22D is shaped so that it fits a portion of ball 20 and also around the stem 21. The outer edge of washer 22C is of such size and contour as to fit over the outer edge of washer 22A.

The two washers 22A and 22C are forced over the stem 21 of an assembly of two halves of the ball 20 and stem 21, together with a short piece of rod material 25, with brazing metal between the various joints or contacting surfaces and the several pieces are then placed in a suitable furnace and brazed together to form one integral whole.

The rod stock 25 is preferably of such length and size as to fit snugly in the half stems and extend to about a radius length from the center of ball 20. Its other end may be spaced a short distance from the end of the stem as shown.

After the brazing operation, the parts are suitably finished and are ready for use.

In order to insure the unauthorized detachment or uncoupling of the elements A and B, a suitable opening 30 is provided in the handle portion of latch 15 for the reception of a suitable lock, e. g. a padlock.

I claim:

1. In a trailer hitch consisting of a socket member adapted to be fixed to the trailer and a ball member adapted to be secured to the draft vehicle, a ball member consisting of a ball having an integral threaded shank or stem and an abutment member adapted to resist thrust longitudinally of said shank, said ball and shank consisting of sheet metal halves each comprising ball and shank portions and said abutment member consisting of coaxial rings surrounding said shank, the said halves and rings being brazed together to form an integral whole.

2. In a trailer hitch consisting of a socket member adapted to be fixed to the trailer and a ball member adapted to be secured to the draft vehicle, a ball member consisting of a ball having an integral threaded shank or stem and an abutment member adapted to resist thrust longitudinally of said shank, said ball and shank consisting of sheet metal halves each comprising ball and shank portions and said abutment member consisting of coaxial rings surrounding said shank, the said halves and rings being brazed together to form an integral whole, and a reinforcing member fixed within said shank.

GEORGE A. SHAIEB.

REFERENCES CITED

The following references are of record in the file of this patent:

UNITED STATES PATENTS

| Number | Name | Date |
|---|---|---|
| 1,889,297 | Russell | Nov. 29, 1932 |
| 1,978,859 | Draeger | Oct. 30, 1934 |
| 2,170,980 | Thorp et al. | Aug. 29, 1939 |
| 2,392,063 | Reimann et al. | Jan. 1, 1946 |

FOREIGN PATENTS

| Number | Country | Date |
|---|---|---|
| 300,750 | Great Britain | Nov. 22, 1928 |